US012597047B2

(12) United States Patent  
Mello et al.

(10) Patent No.: US 12,597,047 B2  
(45) Date of Patent: *Apr. 7, 2026

(54) SYSTEM AND METHOD FOR PROVIDING EXTERNAL NOTIFICATIONS OF EVENTS IN A VIRTUAL SPACE TO USERS

(71) Applicant: Kabam, Inc., Vancouver (CA)

(72) Inventors: Stephanie Mello, San Francisco, CA (US); Jonathan Calipes, San Bruno, CA (US); Deepak Polamarasetty, Fremont, CA (US); Wendy Yu, San Francisco, CA (US)

(73) Assignee: Kabam, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/365,837

(22) Filed: Aug. 4, 2023

(65) Prior Publication Data

US 2023/0376989 A1 Nov. 23, 2023

Related U.S. Application Data

(63) Continuation of application No. 17/962,329, filed on Oct. 7, 2022, now Pat. No. 11,720,912, which is a continuation of application No. 17/580,384, filed on Jan. 20, 2022, now Pat. No. 11,501,324, which is a continuation of application No. 16/950,648, filed on Nov. 17, 2020, now Pat. No. 11,270,327, which is a continuation of application No. 16/735,403, filed on
(Continued)

(51) Int. Cl.  
*G06Q 30/0207* (2023.01)

(52) U.S. Cl.  
CPC ..... *G06Q 30/0209* (2013.01); *G06Q 30/0207* (2013.01)

(58) Field of Classification Search  
None  
See application file for complete search history.

(56) References Cited

U.S. PATENT DOCUMENTS

| 8,137,193 B1 | 3/2012 | Kelly |
| 8,303,416 B1 | 11/2012 | Thakkar |

(Continued)

OTHER PUBLICATIONS

F. Tribal Wars, "Notifications On Incoming Attacks", available on May 7, 2012, retrieved from https://forum.tribalwars.net/index.php?threads/notification-on-incoming-attacks.254163/ (Year: 2012).*

(Continued)

*Primary Examiner* — Sam Refai

(57) ABSTRACT

External notifications of events that take place within a virtual space may be provided to users. External notifications may be sent, for example, via email, text message, instant message (external from the virtual space), push notification and/or through other external communication media. These external notifications may be generated based on parameters, such as user parameters, event parameters, and/or other parameters. The parameters may include one or more parameters that are dynamic and/or one or more parameters that are static. The notifications may include incentive offers. The incentive offers may include offers of virtual items within the virtual space. The incentive offers may require a response to the notification for redemption. The incentive offers may enhance engagement with the virtual space by users.

20 Claims, 3 Drawing Sheets

Related U.S. Application Data

Jan. 6, 2020, now Pat. No. 10,861,035, which is a continuation of application No. 15/876,692, filed on Jan. 22, 2018, now Pat. No. 10,552,857, which is a continuation of application No. 13/527,540, filed on Jun. 19, 2012, now Pat. No. 9,875,482.

(56)                References Cited

U.S. PATENT DOCUMENTS

| | | | |
|---|---|---|---|
| 8,439,759 | B1 | 5/2013 | Mello |
| 8,840,465 | B2 | 9/2014 | Mello |
| 9,272,208 | B1 | 3/2016 | Letourneau |
| 10,482,100 | B1 | 11/2019 | Keswani |
| 10,552,857 | B2 | 2/2020 | Mello |
| 10,861,035 | B2 | 12/2020 | Mello |
| 10,929,335 | B2 | 2/2021 | Delaet |
| 11,270,327 | B2 | 3/2022 | Mello |
| 2002/0123923 | A1 | 9/2002 | Manganaris |
| 2005/0009600 | A1 | 1/2005 | Rowe |
| 2005/0137015 | A1 | 6/2005 | Rogers |
| 2006/0247026 | A1* | 11/2006 | Walker ................ G07F 17/3237 463/25 |
| 2007/0220103 | A1 | 9/2007 | Rogers |
| 2007/0265091 | A1* | 11/2007 | Aguilar, Jr. ............. A63F 13/45 463/42 |
| 2008/0020826 | A1 | 1/2008 | Holch |
| 2008/0026845 | A1 | 1/2008 | Aguilar |
| 2008/0070689 | A1 | 3/2008 | Van Luchene |
| 2008/0090659 | A1 | 4/2008 | Aguilar |
| 2008/0188308 | A1 | 8/2008 | Shepherd |
| 2008/0207327 | A1* | 8/2008 | Van Luchene ......... A63F 13/85 463/42 |
| 2008/0303811 | A1 | 12/2008 | Van Luchene |
| 2009/0088259 | A1 | 4/2009 | Gosztyla |
| 2009/0104954 | A1 | 4/2009 | Weber |
| 2009/0131151 | A1 | 5/2009 | Harris |
| 2010/0005480 | A1 | 1/2010 | Mallempati |
| 2010/0203963 | A1 | 8/2010 | Allen |
| 2010/0229106 | A1 | 9/2010 | Lee |
| 2011/0312423 | A1* | 12/2011 | Mosites ............. G06Q 30/0209 463/42 |
| 2012/0040746 | A1* | 2/2012 | Auterio ................... G07F 17/32 463/25 |
| 2012/0110477 | A1 | 5/2012 | Gaume |
| 2013/0005480 | A1 | 1/2013 | Bethke |
| 2013/0035991 | A1 | 2/2013 | Romero |
| 2013/0079144 | A1 | 3/2013 | Ahmed |
| 2013/0086188 | A1 | 4/2013 | Mays |
| 2013/0090171 | A1 | 4/2013 | Holton |
| 2013/0254278 | A1 | 9/2013 | Buhr |
| 2013/0304581 | A1 | 11/2013 | Soroca |
| 2013/0339228 | A1 | 12/2013 | Shuster |
| 2014/0031117 | A1 | 1/2014 | Mello |
| 2014/0100020 | A1 | 4/2014 | Carroll |
| 2014/0128156 | A1 | 5/2014 | Morioka |
| 2014/0136312 | A1 | 5/2014 | Saksena |
| 2014/0278844 | A1 | 9/2014 | Khanna |
| 2019/0227977 | A1 | 7/2019 | Delaet |
| 2020/0143403 | A1 | 5/2020 | Mello |
| 2021/0073842 | A1 | 3/2021 | Mello |
| 2021/0165757 | A1 | 6/2021 | Delaet |
| 2022/0148024 | A1 | 5/2022 | Mello |
| 2023/0037053 | A1 | 2/2023 | Mello |

OTHER PUBLICATIONS

'HappyTC Demo'. From Wayback Machine Internet Archive [online]. Dec. 1, 2007 [retrieved on Aug. 3, 2017]. Retrieved from the Internet: <URL:https://web.archive.org/web/20071201155431/http://www.happytc.com:80/htc/k/demo/?long=1 >. 4 pages.

"Segmentations & Targeting", printed from http://www.appoxee.com/products/segmentation, printed Nov. 21, 2013, copyrighted 2013 Appoxee, Inc., 2 pages.

Demerjian, C. "Kongregate talks about making money from online games", SemiAccurate.com website, Mar. 7, 2012 [retrieved on Mar. 23, 2020]. Retrieved from the Internet: <URL: https://semiaccurate.com/2012/03/07/kongregate-talks-about-making-money-from-online-games/>. (Year: 2012) (4 pages).

E. Tribal Wars, "Notifications On Incoming Attacks", available on May 7, 2012, retrieved from https://forum.tribalwars.net/index.php?threads/notification-on-incoming-attack.254163/ (Year: 2012) 3 pages.

* cited by examiner

SYSTEM AND METHOD FOR PROVIDING EXTERNAL NOTIFICATIONS OF EVENTS IN A VIRTUAL SPACE TO USERS

FIELD

The disclosure relates to providing notifications of events within a virtual space, the notifications transmitted through communication media external to the virtual space and/or including incentive offers for virtual goods.

BACKGROUND

Typically, virtual spaces are configured such that users are notified of events that have occurred or are occurring (and in some cases that will occur) in the virtual space only while the users are logged in to the virtual space. This may decrease an engagement of users with the virtual space while they are logged out of the virtual space because they may not have access to what is currently transpiring in the virtual space.

Some providers of virtual spaces may provide digests or reports of events in the virtual space generally to users. Such digests or reports may be assembled manually, and may be mass distributed without regard to specific users. The types of events referred to in such reports or digests may include incentives, maintenance notices, information about new content, and/or other happenstance that are generally applicable to users of the virtual space.

SUMMARY

One aspect of the disclosure relates to providing notifications of events that take place within a virtual space to users of the virtual space. Such notifications may keep users abreast of what is transpiring in the virtual space while they are not logged in. Further, such notifications may provide a mechanism for encouraging users to log back in to the virtual space, thereby enhancing engagement of the users with the virtual space. The notifications may include incentive offers for virtual goods to further encourage users to log back in. Notifications may be customized for the individual users based on user parameters, parameters of an event for which a notification may be generated, and/or other parameters of information.

A system configured to provide external notifications of events that take place within a virtual space may include a server. The server may operate in a client/server architecture with one or more client computing platforms. The client computing platforms may be associated with the users of the virtual space. The server may be configured to execute one or more of user module, a trigger module, a notification decision module, a notification composition module, an offer determination module, a notification transmission module, an offer fulfillment module, and/or other modules.

The space module may configured to execute an instance of a virtual space. The space module may implement the instance of the virtual space to facilitate participation by users in a game within the space by determining view information from the instance and transmitting the view information to client computing platforms associated with the users. The view information may facilitate presentation of views of the virtual space to the users by the client computing platforms. The users may participate in the game by controlling one or more entities within the virtual space. The users may comprise a first user that controls a first entity within the virtual space.

The user module may be configured to manage user accounts associated with the individual users. The user accounts may include user parameters related to the users. The user accounts may include a first user account associated with the first user that includes a first set of user parameters related to the first user.

The trigger module may be configured to identify trigger events within the virtual space that correspond to notifications. This may include monitoring the instance of the virtual space to find trigger events in the instance of the virtual space. The trigger module may identify the users associated with the identified trigger events. For example, responsive to the occurrence of a first trigger event that impacts the first entity, the trigger module may identify the first trigger event and may identify the first user as a user associated with the first trigger event.

The notification decision module may be configured to determine whether the notifications of the identified trigger events should be transmitted to the users associated with the identified trigger events. These determinations may be based on the user parameters related to the users. For example, responsive to identification of the first trigger event, the notification decision module may determine whether a first notification of the first trigger event should be transmitted to the first user based on at least one user parameter from the first set of user parameters. The at least one parameter from the first set of user parameters may include one or more of an activity metric that indicates an activity of the first user in the virtual space, a parameter determined from information related to one or more previous notifications transmitted to the first user, and/or a parameter determined from a response of the first user to a previous notification.

The notification composition module may be configured to compose notifications for transmission to the users. This may include determining one or more of notification content, notification format, communication media, and/or other aspects of the notifications. Notification content may include text, images, and/or other content included in a notification. Determining the communication media may include selecting one or more communication media (e.g., email, text, instant message, and/or other media) for a notification. A notification may be composed by the notification composition module based on one or more of event parameters, user parameters, user settings, a selected communication media for the notification, and/or other parameters or information.

The offer determination module may be configured to determine incentive offers of virtual items for inclusion in the notifications. The incentive offers may be for virtual items within the virtual space. The determinations of the incentive offers may include determining whether individual notifications should include incentive offers, determining virtual items for inclusion in the incentive offers, determining prices or rebates for the incentive offers, determining incentive criteria to be met for redemption of the incentive offers, and/or determining other aspects of the incentive offers. The determinations of the incentive offers may be based on the user parameters. For example, determination of a first incentive offer in the first notification may be determined based on at least one user parameter from the first set of user parameters, based on event parameters, and/or based other parameters or information. The incentive criteria may include a timeliness requirement that may a response by the first user to the first notification within a certain amount of time from transmission of the first notification.

The notification transmission module may be configured to transmit notifications through electronic communication media external to the virtual space. For example, such that, responsive to the trigger module determining that the first notification should be transmitted to the first user, the notification transmission module transmits the first notification to the first user via a first electronic communication medium that is external to the virtual space. The first electronic communication medium may include one or more of an email, a text message, an instant message, a push notification, and/or other electronic communication media.

The offer fulfillment module may be configured to facilitate redemption of incentive offers included in notifications. This may include awarding virtual items offered to users in accordance with the incentive offers. Awarding the virtual items to users may include providing the virtual items to the users, and/or to entities under control of the users, in the virtual space. For incentive offers having incentive criteria, the offer fulfillment module may be configured to award the virtual items responsive to the incentive criteria being fulfilled.

The notification response tracking module may be configured to track responses to notifications sent to the users. This may include tracking one or more access time(s) for notifications (e.g., through communication with an email or messaging server), interactions with the notifications, acceptance of offers in the notifications, logins by users subsequent to receiving notifications, and/or other interactions with or responses to the notifications. The information obtained by the notification response tracking module in tracking responses to notifications may be saved by the user accounts. The information may be used by the notification decision module, the notification composition module, the offer determination module, and/or other modules.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
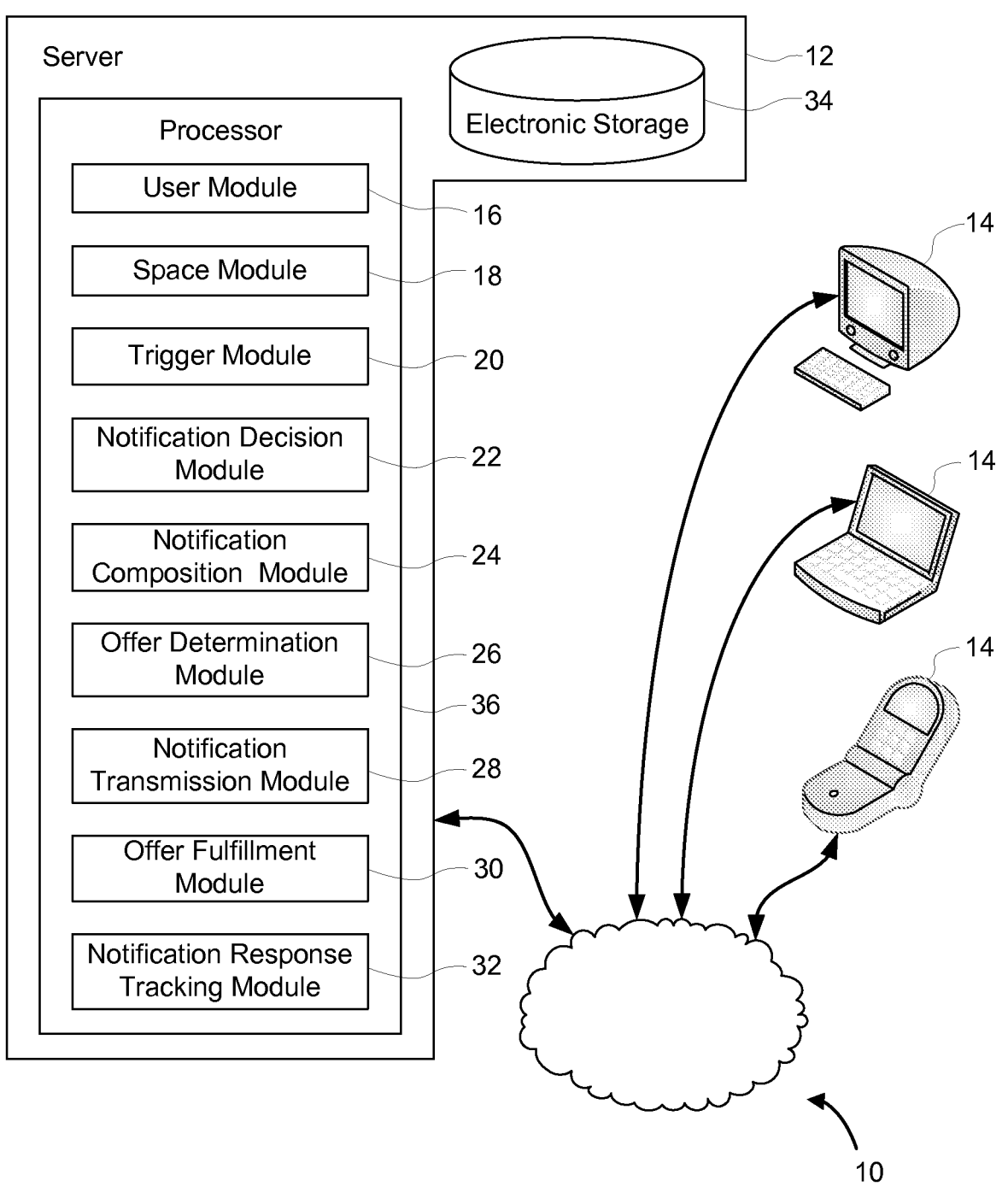
FIG. 1 illustrates a system configured to provide external notifications of events that take place within a virtual space.

FIG. 1 illustrates a system 10 configured to provide external notifications of events that take place within a virtual space. External notifications may be sent, for example, via email, text message, instant message (external from the virtual space), and/or through other external communication media. These external notifications may be generated based on parameters, such as user parameters, event parameters, and/or other parameters. The parameters may include one or more parameters that are dynamic and/or one or more parameters that are static. The notifications may include incentive offers. The incentive offers may include offers of virtual items within the virtual space. The incentive offers may require a response to the notification for redemption. The incentive offers may enhance engagement with the virtual space by users. In some implementations, system 10 may include a server 12. Server 12 may be configured to communicate with one or more client computing platforms 14 according to a client/server architecture. The users may access system 10 and/or the virtual space via client computing platforms 14.

Server 12 may be configured to execute one or more computer program modules. The one or more computer program modules may include one or more of a user module 16, a space module 18, a trigger module 20, a notification decision module 22, a notification composition module 24, an offer determination module 26, a notification transmission module 28, an offer fulfillment module 30, a notification response tracking module 32, and/or other modules.

User module 16 may be configured to access and/or manage one or more user accounts associated with users of system 10. The user accounts may include user information. The one or more user accounts and/or user information may include information stored by server 12, one or more of the client computing platforms 14, and/or other storage locations. The user accounts may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, user settings, and/or other information related to users. The user information may include and/or indicate an activity level of the user. The activity level may include previous login time(s), previous logout time(s), login frequency, time spent logged in, and/or other activity information. The user information may include information related to purchases in or for the virtual space. Such information may include, for example, purchase information for individual transactions, a spend rate, a total spend amount, and/or other information related to user purchases.

As will be discussed further below, users may participate in the virtual space by controlling entities within the virtual space. The user information in the user accounts may include information related to the entities controlled by the users in the virtual space. Such information may include, for example, an entity type, an entity class, an entity identification, a level, inventory information, status information, and/or other information related to entities controlled by users in the virtual space.

Space module 18 may be configured to implement the instance of the virtual space executed by the computer modules to determine view information defining views of the virtual space. The view information may then be communicated (e.g., via streaming, via object/position data, and/or other information) from server 12 to client computing platforms 14 for presentation to users. The view information determined and transmitted to a given client computing platform 14 may correspond to an entity being controlled by a user via the given client computing platform 14. The view information determined and transmitted to a given client computing platform 14 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platforms 14) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 18 is not intended to be limiting. Space module 18 may be configured to express the virtual space in a more limited, or more rich, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 16, users may control entities to interact with the virtual space and/or each other. The entities may include one or more of characters, objects, simulated physical phenomena (e.g., wind, rain, earthquakes, and/or other phenomena), and/or other elements within the virtual space. The user characters may include avatars. As used herein, an entity may refer to an object (or group of objects) present in the virtual space that represents an individual user. The entity may be controlled by the user with which it is associated. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

Control over the entities may be exercised by the users through control inputs and/or commands input through client computing platforms 14. The users may interact with each other through communications exchanged within the virtual space. Such communications may include one or more of textual chat, instant messages, private messages, voice communications, and/or other communications. Communications may be received and entered by the users via their respective client computing platforms 14. Communications may be routed to and from the appropriate users through server 12 (e.g., through space module 18).

Within the virtual space, users may participate in a game. The game may include various tasks, levels, quests, and/or other challenges or activities for users to participate in. The game may include activities in which users (or their entities) are adversaries, and/or activities in which users (or their entities) are allies. The game may include activities in which users (or their entities) are adversaries of non-player characters, and/or activities in which users (or their entities) are allies of non-player characters. In the game, entities controlled by the user may obtain points, virtual currency or other virtual items, experience points, levels, and/or other demarcations indicating experience and/or success. Space module 18 may be configured to perform the functions associated with the game in executing the instance of the virtual space.

Trigger module 20 may be configured to identify trigger events within the virtual space. The trigger events may correspond to external notifications provided to the users. Trigger module 20 may identify trigger events by monitoring the instance of the virtual space, and identifying events occurring in the instance that correspond to events in a specific set of events. Trigger events may include or be associated with, for example, upgrades, contests (e.g., attacks, challenges, or other contest or invitations to contests), travel in the virtual space (e.g., as an entity or a portion of an entity travels from one location in the virtual space to another locations), special occasions in the virtual space, entity creation (e.g., spawning or generation of new units of equipment and/or troops), and/or other events.

The events in the set of events may include various types of events. For example, the events in the set of events may include conclusory events, initiatory events, first party events, third party events, warning events, and/or other types of events. A conclusory event may occur at the end of some process. By way of example, a conclusory event may occur at the end of an upgrade period, at the end of a travel period, at the end of a contest (e.g., between entities controlled by users), at the end of a cool down period, and/or at the end of other processes. An initiatory event may occur at the beginning of a process. An event may be a first party event to a user that initiates the event (or the corresponding process), or the event may be a first party event to a user directly involved in the event (or the corresponding process). An event may be a third party event to a user that did not initiate the event (or corresponding process), or the event may be a third party event to a user that is not directly involved in the event (or corresponding process).

In identifying the trigger events, trigger module 20 may identify the users associated with the trigger events. The users associated with a trigger event may include a user (or the user controlling the entity) that initiates the trigger event, a user (or the user controlling the entity) that is the target or object of the trigger event, and/or other users.

Notification decision module 22 may be configured to determine whether notifications of the identified trigger events should be transmitted. Such determinations may be made based on one or more of an event parameter, a user parameter, a user setting, an entity parameter, and/or other parameters or information. Event parameters may include one or more event type, event outcome, event timing, and/or other parameters.

User parameters may be stored in the user accounts managed by user module 16. User parameters may include one or more of an activity level parameter, a previous notification parameter, a notification response parameter, a user spending parameter, and/or other parameters. An activity level parameter may indicate an activity level of the user in the virtual space. A previous notification parameter may reflect previous notifications generated to a user. For example, a previous notification parameter may reflect a time of a previous notification, a number of notifications within some window of time (e.g., a current day, a current hour, a current week, a rolling window of time, and/or other windows of time), a notification frequency, and/or other parameters related to one or more previous notifications. A notification response parameter may reflect a responsiveness of the user to previous notifications. A user spending parameter may reflect spending of the user in the virtual space.

User settings may include settings under the direct control of the user. For example, a user may setting may specify certain types of events for which notifications should or should not be received, a maximum number of notifications within some period of time, and/or other user configurable settings. In some implementations, user configured user settings may be adjusted automatically based on user behavior (e.g., responsiveness, activity, spending, and/or other behavior). However, user settings may differ from user parameters in that user parameters may be derived from user behavior in the virtual space while user settings may be controlled directly (e.g., through a control interface).

Entity parameters may reflect information about a user controlled entity within the virtual space. Such information may include, for example, a status, an inventory, a level, a score, a virtual currency account, a relationship (e.g., an alliance, a friendship, and/or other relationships), and/or other information. Entity parameters may be stored in the user accounts managed by user module 16.

Notification decision module 22 may be configured such that responsive to an event being triggered, a set of one or more rules may be accessed. The set of one or more rules may specify, based on one or more of an activity level parameter, a previous notification parameter, a notification response parameter, a user spending parameter, and/or other parameters, whether a notification should be sent to one or more of the users associated with the event. By way of non-limiting example, an attack by a first entity controlled by a first user on a second entity controlled by a second user may be identified as a trigger event by trigger module 20. Responsive to such identification, notification decision module 22 may determine whether a notification of the attack should be sent to the second user. The determination may be based on an activity parameter of the second user (e.g., no notification may be generated if the second user is no longer active in the virtual space), a responsiveness of the second user to notifications (e.g., no notification may be generated if the second user has traditionally not responded to notifications), a previous notification parameter (e.g., no notification may be generated if the second user has already received a threshold number of notifications in the past day), and/or other parameters.

Notification composition module 24 may be configured to compose notifications for transmission to the users. This may include determining one or more of notification content, notification format, communication media, and/or other aspects of the notifications. Notification content may include text, images, and/or other content included in a notification. Determining the communication media may include selecting one or more communication media (e.g., email, text, instant message, and/or other media) for a notification. A notification may be composed by notification composition module 24 based on one or more of event parameters, user parameters, user settings, a selected communication media for the notification, and/or other parameters or information.

Notifications may include incentive offers for virtual items. A virtual item may include one or more of an item of clothing, a tool, a weapon, a pet, a vehicle, currency, a potion or elixir, ingredients, and/or other virtual items that exist in the virtual space. A virtual item may provide a functional advantage in the virtual space to its owner (e.g., an advantage in the game). A virtual item may be expressed aesthetically within views of the instance of the virtual space. A virtual item may have value in the virtual space that facilitates trading the virtual item for some other consideration within the virtual space (e.g., for another virtual item, for a service, for an advantage, and/or other consideration). Offer determination module 26 may be configured to determine incentive offers for notifications. This may determine whether a notification should include an incentive offer, determining a virtual item for inclusion in an incentive offer, determining a discount for an incentive offer, determining a price of one or more virtual items in an incentive offer, and/or determining other parameters of an incentive offer. Such determinations may be made, for example, based on event parameters, user parameters, and/or other parameters.

The determination of an incentive offer may be based on event parameters such as, for example, an event type, an event outcome, an event timing, and/or other event parameters. For example, for a notification of a contest event type (e.g., an attack against an entity being controlled by the notified user), offer determination module 26 may be configured to determine an incentive offer for the notified user of one or more virtual items that will be useful in the event, an incentive offer for the notified user of one or more virtual items to replace items lost or used in the event (e.g., at the conclusion of the event), and/or another incentive offer relevant to the contest event. For a notification of an upgrade event type, offer determination module 26 may be configured to determine an incentive offer that includes a virtual item usable with the upgraded entity or item, an incentive offer of a virtual item that will facilitate or speed additional upgrading, and/or another incentive offer relevant to the upgrade event. Other determinations of virtual items for inclusion in incentive offers in notifications based on event parameters are contemplated.

The determination of an incentive offer may be based on user parameters such as, for example, an activity level parameter, a user spending parameter, and/or other parameters. Determination of an incentive offer based on an activity level parameter may include attempting to lure an inactive user back to the virtual space (e.g., making a more valuable offer to less active users). Determination of an incentive offer based on a user spending parameter may include attempting to entice a user to make a larger purchase than usual, attempting to entice a user to spend money for a different type of virtual item, and/or enticing other spending behaviors. Other determinations of virtual items for inclusion in incentive offers in notifications based on user parameters are contemplated.

The incentive offers determined by offer determination module 26 may include incentive criteria. These determinations may be made based on user parameters, event parameters, and/or other parameters. Incentive criteria for a given incentive offer may specify one or more conditions to be met by a user before the user can redeem the given incentive offer. The incentive criteria may include, without limitation, a timeliness requirement. The timeliness requirement may specify a time (e.g., from transmission) by which the user must respond to the notification and/or the incentive offer in order to redeem the incentive offer. A user may be said to "respond" to a notification upon logging into the virtual space subsequent to receiving the notification. The notification may include a notification reference that can be provided by the user (and/or client computing platform 14 associated with the user) that indicates a log in is a response to the notification. For example, the notification reference may be provided automatically by the client computing platform 14 associated with the user responsive to selection of a link included in the notification. The notification reference may be provided manually by the user upon a subsequent login to the virtual space. Other techniques for receiving the notification reference from the user are contemplated.

Notification transmission module 28 may be configured to transmit notifications to users. Such transmission may be made through communication media external to the virtual space. For example, notification transmission module 28 may transmit notifications to users via email, text message, instant message, and/or other communication media external to the virtual space. Communication media external to the virtual space may include communication media not relayed to the users by server 12. Instead, such communication may be relayed to the users through an external service provider. As notifications are transmitted to users, records of such transmissions may be made (e.g., in the user accounts). The records may include information about one or more of a format of the notifications, the trigger events that triggered the notifications, the content in the notifications, the communication media used to transmit the notifications, and/or other information about the notifications. These records may be used by notification decision module 22, notification composition module 24, offer determination module 26, and/or other modules.

Offer fulfillment module 30 may be configured to facilitate redemption of incentive offers included in notifications. This may include awarding virtual items offered to users in accordance with the incentive offers. Awarding the virtual items to users may include providing the virtual items to the users, and/or to entities under control of the users, in the virtual space. For incentive offers having incentive criteria, offer fulfillment module 30 may be configured to award the virtual items responsive to the incentive criteria being fulfilled.

Notification response tracking module 32 may be configured to track responses to notifications sent to the users. This may include tracking one or more access time(s) for notifications (e.g., through communication with an email or messaging server), interactions with the notifications, acceptance of offers in the notifications, logins by users subsequent to receiving notifications, purchase activity subsequent to receiving notifications, and/or other interactions with or responses to the notifications. The information obtained by notification response tracking module 32 in tracking responses to notifications may be saved by the user accounts. The information may be used by notification decision module 22, notification composition module 24, offer determination module 26, and/or other modules.

Server 12 and/or client computing platforms 14 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 12 and/or client computing platforms 14 may be operatively linked via some other communication media.

A given client computing platform 14 may include one or more processors configured to execute computer program modules. The computer program modules may be configured to enable an expert or user associated with the given client computing platform 14 to interface with server 12, and/or provide other functionality attributed herein to client computing platforms 14. By way of non-limiting example, the given client computing platform 14 may include one or more of a desktop computer, a laptop computer, a handheld computer, a tablet computing platform, a NetBook, a Smartphone, a gaming console, and/or other computing platforms.

Server 12 may include electronic storage 34, one or more processors 36, and/or other components. Server 12 may include communication lines, or ports to enable the exchange of information with a network and/or other computing platforms. Illustration of server 12 in FIG. 1 is not intended to be limiting. Server 12 may include a plurality of hardware, software, and/or firmware components operating together to provide the functionality attributed herein to server 12. For example, server 12 may be implemented by a cloud of computing platforms operating together as server 12.

Electronic storage 34 may comprise electronic storage media that electronically stores information. The electronic storage media of electronic storage 34 may include one or both of system storage that is provided integrally (i.e., substantially non-removable) with server 12 and/or removable storage that is removably connectable to server 12 via, for example, a port (e.g., a USB port, a firewire port, etc.) or a drive (e.g., a disk drive, etc.). Electronic storage 34 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 34 may include one or more virtual storage resources (e.g., cloud storage, a virtual private network, and/or other virtual storage resources). Electronic storage 34 may store software algorithms, information determined by processor 36, information received from server 12, information received from client computing platforms 14, and/or other information that enables server 12 to function as described herein.

Processor(s) 36 is configured to provide information processing capabilities in server 12. As such, processor 36 may include one or more of a digital processor, an analog processor, a digital circuit designed to process information, an analog circuit designed to process information, a state machine, and/or other mechanisms for electronically processing information. Although processor 36 is shown in FIG. 1 as a single entity, this is for illustrative purposes only. In some implementations, processor 36 may include a plurality of processing units. These processing units may be physically located within the same device, or processor 36 may represent processing functionality of a plurality of devices operating in coordination. The processor 36 may be configured to execute modules 16, 18, 20, 22, 24, 26, 28, 30, and/or 32. Processor 36 may be configured to execute modules 16, 18, 20, 22, 24, 26, 28, 30, and/or 32 by software; hardware; firmware; some combination of software, hardware, and/or firmware; and/or other mechanisms for configuring processing capabilities on processor 36.

It should be appreciated that although modules 16, 18, 20, 22, 24, 26, 28, 30, and 32 are illustrated in FIG. 1 as being co-located within a single processing unit, in implementations in which processor 36 includes multiple processing units, one or more of modules 16, 18, 20, 22, 24, 26, 28, 30, and/or 32 may be located remotely from the other modules. The description of the functionality provided by the different modules 16, 18, 20, 22, 24, 26, 28, 30, and/or 32 described below is for illustrative purposes, and is not intended to be limiting, as any of modules 16, 18, 20, 22, 24, 26, 28, 30, and/or 32 may provide more or less functionality than is described. For example, one or more of modules 16, 18, 20, 22, 24, 26, 28, 30, and/or 32 may be eliminated, and some or all of its functionality may be provided by other ones of modules 16, 18, 20, 22, 24, 26, 28, 30, and/or 32. As another example, processor 36 may be configured to execute one or more additional modules that may perform some or all of the functionality attributed below to one of modules 16, 18, 20, 22, 24, 26, 28, 30, and/or 32.

Figure 2:
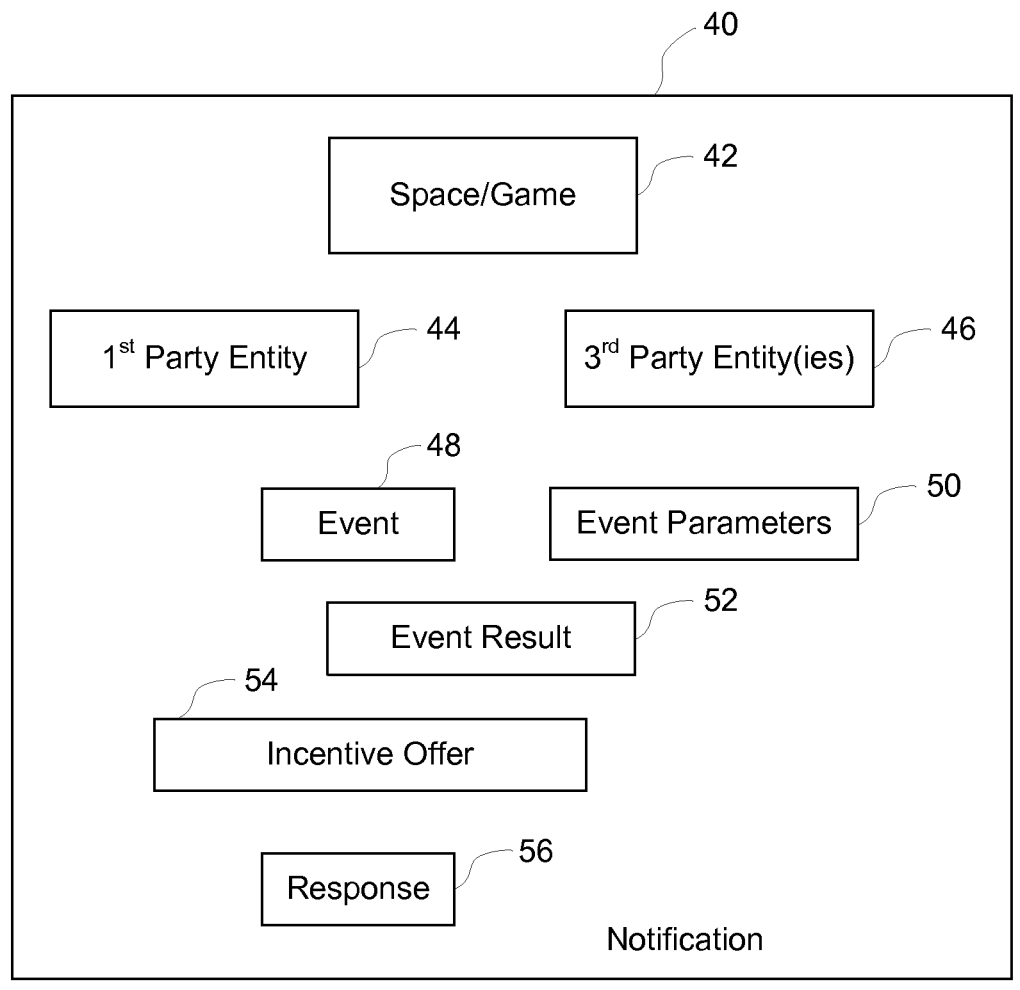
FIG. 2 illustrates a view of a notification of an event that has taken place in a virtual space.

FIG. 2 illustrates a view 40 of a notification generated to inform a user of a trigger event that has occurred in a virtual space. The notification may be transmitted to a client computing platform associated with the user. View 40 of the notification may be presented to the user on the client computing platform. View 40 may include one or more of a virtual space/game field 42, a first party entity field 44, a third party entity field 46, an event field 48, an event parameter field 50, an event result field 52, an incentive offer field 54, a response field 56, and/or other fields or content. Virtual space/game field 42 may present a name of the virtual space or game in which the trigger event occurred. First party entity field 44 may include information related to one or more entities under control of the user in the virtual space that were impacted by the trigger event. Such information may include a name, a status, a level, inventory information, a health, and/or other information. Third party entity field 46 may include information related to one or more entities not under control of the user (e.g., under another user's control, or non-player characters). Such information may include a name, a status, a level, inventory information, a health, and/or other information. Event field 48 may include an identification of the trigger event. Event parameter field 50 may include event parameters of the trigger event. Event result field 52 may include a result of the trigger event. Incentive offer field 54 may include information related to an incentive offer being extended to the user in the notification. Such information may include one or more of a virtual item offered, a rebate, a price, incentive criteria to be fulfilled by the user, and/or other information. Response field 56 may include information that facilitates a response to the notification by the user. Response field 56 may include information that facilitates tracking of a response of the user to the notification. For example, response field 56 may include a selectable link that results in the user logging in to the virtual space. Response field 56 may include a code or identifier to be presented upon a subsequent login to the virtual space to indicate such login is in response to the notification (e.g., to accept an incentive offer). Other types of information are contemplated for inclusion in response field 56.

Figure 3:
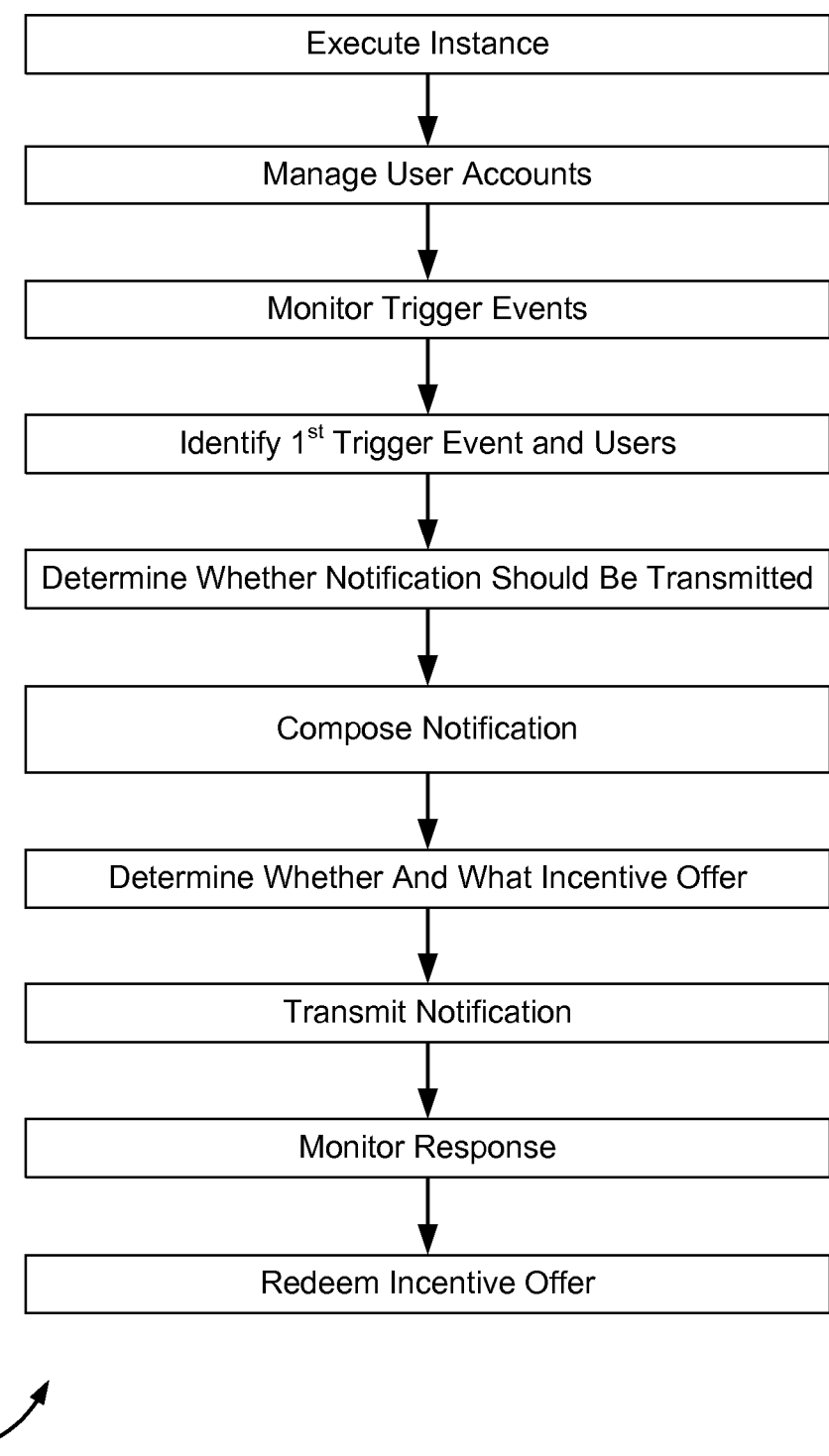
FIG. 3 illustrates a method of providing external notifications of events that take place within a virtual space.

FIG. 3 illustrates a method 60 of providing external notifications of events that take place within a virtual space. The operations of method 60 presented below are intended to be illustrative. In some embodiments, method 60 may be accomplished with one or more additional operations not described, and/or without one or more of the operations discussed. Additionally, the order in which the operations of method 60 are illustrated in FIG. 3 and described below is not intended to be limiting.

In some embodiments, method 60 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 60 in response to instructions stored electronically on an electronic storage medium. The one or more processing devices may include one or more devices configured through hardware, firmware, and/or software to be specifically designed for execution of one or more of the operations of method 60.

At an operation 62, an instance of a virtual space may be executed and implemented to determine view information for transmission to one or more client computing platforms associated with users. The users may participate in the virtual space by controlling entities therein. The users may include a first user. The first user may control a first entity. In some implementations, operation 62 may be performed by a space module the same as or similar to space module 18 (shown in FIG. 1 and described herein).

At an operation 64, user accounts associated with the users may be managed. The user accounts may include a first account associated with the first user. The first account may include a first set of user parameters that correspond to the first user. In some implementations, operation 64 may be performed by a user module the same as or similar to user module 16 (shown in FIG. 1 and described herein).

At an operation 66, trigger events in the instance of the virtual space may be monitored. In some implementations, operation 66 may be performed by a trigger module the same as or similar to trigger module 20 (shown in FIG. 1 and described herein).

At an operation 68, a first trigger event that impacts the first entity may be identified during the monitoring performed at operation 66. The first user may be identified as a user associated with the first event by virtue of the impact to the first entity. In some implementations, operation 68 may be performed by a trigger module the same as or similar to trigger module 20 (shown in FIG. 1 and described herein).

At an operation 70, responsive to identification of the first trigger event, a determination may be made as to whether a first notification of the first trigger event should be sent to the first user. This determination may be made on the first set of user parameters, event parameters related to the first trigger event, and/or other parameters or information. In some implementations, operation 70 may be performed by a notification decision module the same as or similar to notification decision module 22 (shown in FIG. 1 and described herein).

At an operation 72, responsive to a determination that the first notification should be transmitted to the first user, a composition of the first notification may be determined. In some implementations, operation 72 may be performed by a notification composition module the same as or similar to notification composition module 24 (shown in FIG. 1 and described herein).

At an operation 74, an incentive offer for the first notification may be determined. Determining the incentive offer may include determining whether an incentive offer for one or more virtual items should be included in the first notification, determining the one or more virtual items for inclusion in the incentive offer, determining a rebate or price for the one or more virtual items, and/or determining other aspects of the incentive offer. In some implementations, operation 74 may be performed by an offer determination module the same as or similar to offer determination module 26 (shown in FIG. 1 and described herein).

At an operation 76, the first notification may be transmitted to the first user. In some implementations, operation 76 may be performed by a notification transmission module the same as or similar to notification transmission module 28 (shown in FIG. 1 and described herein).

At an operation 78, a response of the first user to the first notification may be tracked. In some implementations, operation 78 may be performed by a notification response tracking module the same as or similar to notification response tracking module 32 (shown in FIG. 1 and described herein).

At an operation 80, the incentive offer included in the first notification may be redeemed to the first user. In some implementations, operation 80 may be performed by an offer fulfillment module the same as or similar to offer fulfillment module 30 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to provide notifications to users of a game in a virtual space upon being triggered by contest events in the game, wherein the users include a first user, wherein the first user is associated with a first electronic device that is used by the first user to interact with the game, the system comprising:

one or more physical processors configured by machine-readable instructions to:

obtain first user settings information regarding one or more user settings controlled by the first user, wherein the one or more user settings pertain to types of contests for which notifications either should be received or should not be received by the users, wherein the one or more user settings further pertain to a particular electronic device that is selected by the first user to receive the notifications, wherein the particular electronic device is a second electronic device that is different from the first electronic device, wherein the second electronic device is associated with the first user;

electronically receive information regarding an occurrence of a first contest event in the game, wherein the first contest event is associated with a first contest in the game between the first user and another user, wherein the information has been electronically transferred by the first electronic device;

determine, by the one or more physical processors, whether a first notification should be transmitted to the first user, wherein the determination is based on the first user settings information and a first type of the first contest;

determine a first virtual item based on a first outcome of the first contest and based on a particular user-specific parameter that is specific to the first user;

responsive to determining the first notification should be transmitted, automatically determine, by the one or more physical processors, a first incentive offer for inclusion in the first notification to the first user, wherein the first incentive offer includes an offer for the first virtual item; and automatically effectuate an electronic transmission of the first notification to the second electronic device in accordance with the one or more user settings controlled by the first user.

2. The system of claim 1, wherein the determination whether the first notification should be transmitted to the first user is further based on at least one user parameter, wherein the at least one user parameter is specific to the first user.

3. The system of claim 1, wherein the first notification is transmitted via a first electronic communication medium that is external to the game, and wherein the first electronic communication medium is one of an email, a text message, an instant message, or a push notification.

4. The system of claim 2, wherein the one or more physical processors are further configured such that the at least one user parameter is based on one or more of:

an activity metric that indicates an activity of the first user in the game, a parameter determined from information related to one or more previous notifications transmitted to the first user, and/or a second parameter determined from a response of the first user to a previous notification.

5. The system of claim 1, wherein the first incentive offer is associated with one or more incentive criteria that must be met for the first user to redeem the first incentive offer, and wherein the one or more incentive criteria include a timeliness requirement that requires a response by the first user to the first notification within a certain amount of time from the transmission of the first notification.

6. The system of claim 1, wherein the one or more physical processors are further configured such that the determination of the first incentive offer further includes determination of one or more of (i) a discount for the first virtual item, and/or (ii) a price for the first virtual item.

7. The system of claim 1, wherein the one or more physical processors are further configured such that the determination of the first incentive offer is further based on at least one of (i) the first type of the first contest, and/or (ii) the first outcome of the first contest.

8. The system of claim 1, wherein the one or more physical processors are further configured to facilitate redemption of the first incentive offer within the game.

9. The system of claim 1, wherein the first incentive offer offers the first user to purchase the first virtual item.

10. A computer-implemented method of providing notifications to users of a game in a virtual space upon being triggered by contest events in the game, wherein the users include a first user, wherein the first user is associated with a first electronic device that is used by the first user to interact with the game, the method being implemented in one or more physical processors, the method comprising:

obtaining first user settings information regarding one or more user settings controlled by the first user, wherein the one or more user settings pertain to types of contests for which notifications either should be received or should not be received by the users, wherein the one or more user settings further pertain to a particular electronic device that is selected by the first user to receive the notifications, wherein the particular electronic device is a second electronic device that is different from the first electronic device, wherein the second electronic device is associated with the first user;

electronically receiving information regarding an occurrence of a first contest event in the game, wherein the first contest event is associated with a first contest in the game between the first user and another user, wherein the information has been electronically transferred by the first electronic device;

determining whether a first notification should be transmitted to the first user, wherein the determination is based on the first user settings information and a first type of the first contest;

determining a first virtual item based on a first outcome of the first contest and based on a particular user-specific parameter that is specific to the first user;

responsive to determining the first notification should be transmitted, automatically determining a first incentive offer for inclusion in the first notification to the first user, wherein the first incentive offer includes an offer for the first virtual item; and automatically effectuating an electronic transmission of the first notification to the second electronic device in accordance with the one or more user settings controlled by the first user.

11. The method of claim 10, wherein determining whether the first notification should be transmitted to the first user is further based on at least one user parameter, wherein the at least one user parameter is specific to the first user.

12. The method of claim 10, wherein the first notification is transmitted via a first electronic communication medium that is external to the game, and wherein the first electronic communication medium is one of an email, a text message, an instant message, or a push notification.

13. The method of claim 11, wherein the at least one user parameter is based on one or more of:

an activity metric that indicates an activity of the first user in the game, a first parameter determined from information related to one or more previous notifications transmitted to the first user, and/or a second parameter determined from a response of the first user to a previous notification.

14. The method of claim 10, wherein the first incentive offer is associated with one or more incentive criteria that must be met for the first user to redeem the first incentive offer, and wherein the one or more incentive criteria include a timeliness requirement that requires a response by the first user to the first notification within a certain amount of time from the transmission of the first notification.

15. The method of claim 10, wherein the determination of the first incentive offer further includes determination of one or more of (i) a discount for the first virtual item, and/or (ii) a price for the first virtual item.

16. The method of claim 10, wherein the determination of the first incentive offer is further based on at least one of (i) the first type of the first contest, and/or (ii) the first outcome of the first contest.

17. The method of claim 10, further comprising facilitating redemption of the first incentive offer within the game.

18. The method of claim 10, wherein the first incentive offer offers the first user to purchase the first virtual item.

19. The system of claim 1, wherein the one or more physical processors are further configured to:

implement an instance of the game in the virtual space to facilitate interaction between the first user and the instance of the game in the virtual space;

transfer, via an electronic communication network, view information from the instance to the first electronic device associated with the first user, wherein the view information includes views of the virtual space; and facilitate a presentation, based on the view information, on a user interface of the first electronic device.

20. A system configured to provide notifications to users of a game in a virtual space upon being triggered by contest events in the game, wherein the users include a first user, wherein the first user is associated with a first electronic device that is used by the first user to interact with the game, the system comprising:

one or more physical processors configured by machine-readable instructions to:

obtain first user settings information regarding one or more user settings controlled by the first user, wherein the one or more user settings pertain to types of contests for which notifications either should be received or should not be received by the users, wherein the one or more user settings further pertain to a particular electronic device that is selected by the first user to receive the notifications, wherein the particular electronic device is a second electronic device that is different from the first electronic device, wherein the second electronic device is associated with the first user;

electronically receive information regarding an occurrence of a first contest event in the game, wherein the first contest event is associated with a conclusion of a first contest in the game between the first user and another user, wherein the information has been electronically transferred by the first electronic device;

determine, by the one or more physical processors, whether a first notification should be transmitted to the first user, wherein the determination is based on the first user settings information and a first type of the first contest;

determine a first virtual item based on an outcome at the conclusion of the first contest and based on a particular user-specific parameter that is specific to the first user;

responsive to determining the first notification should be transmitted, automatically determine, by the one or more physical processors, a first incentive offer for inclusion in the first notification to the first user, wherein the first incentive offer includes an offer for the first virtual item; and automatically effectuate an electronic transmission of the first notification to the second electronic device in accordance with the one or more user settings controlled by the first user.

* * * * *